United States Patent
Lee et al.

(10) Patent No.: US 9,860,742 B2
(45) Date of Patent: Jan. 2, 2018

(54) BANDWIDTH ESTIMATION-BASED STREAMING CONTENT PROCESSING METHOD AND APPARATUS OF TERMINAL

(71) Applicant: Samsung Electronics Co., Ltd., Suwon-si, Gyeonggi-do (KR)

(72) Inventors: Younggyun Lee, Gumi-si (KR); Seongyeob Kim, Gumi-si (KR); Kangsik Shin, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 14/189,208

(22) Filed: Feb. 25, 2014

(65) Prior Publication Data

US 2014/0244805 A1    Aug. 28, 2014

(30) Foreign Application Priority Data

Feb. 26, 2013 (KR) ........................ 10-2013-0020708

(51) Int. Cl.
| | |
|---|---|
| *G06F 15/16* | (2006.01) |
| *H04W 8/24* | (2009.01) |
| *H04L 29/06* | (2006.01) |
| *H04N 21/845* | (2011.01) |
| *H04W 4/00* | (2009.01) |

(Continued)

(52) U.S. Cl.
CPC ......... *H04W 8/245* (2013.01); *H04L 65/1069* (2013.01); *H04L 65/60* (2013.01); *H04L 65/80* (2013.01); *H04N 21/23439* (2013.01); *H04N 21/44209* (2013.01); *H04N 21/6131* (2013.01); *H04N 21/64738* (2013.01); *H04N 21/64753* (2013.01); *H04N 21/6587* (2013.01); *H04N 21/8456* (2013.01); *H04W 4/001* (2013.01)

(58) Field of Classification Search
CPC ... H04L 65/80; H04L 65/60; H04N 21/44209; H04N 21/64738; H04N 21/23439; H04N 21/64753; H04W 4/001; H04W 8/245
See application file for complete search history.

(56) References Cited

U.S. PATENT DOCUMENTS

| | | | | |
|---|---|---|---|---|
| 8,782,727 | B1 * | 7/2014 | Nagarajan | H04L 43/0888 |
| | | | | 725/115 |
| 9,185,017 | B1 * | 11/2015 | Nagarajan | H04L 43/0888 |

(Continued)

FOREIGN PATENT DOCUMENTS

| | | |
|---|---|---|
| KR | 10-2010-0066619 A | 6/2010 |
| WO | 2011/047335 A1 | 4/2011 |

*Primary Examiner* — Mohamed Wasel
(74) *Attorney, Agent, or Firm* — Jefferson IP Law, LLP

(57) ABSTRACT

A bandwidth estimation-based streaming content processing method and apparatus of a terminal is provided. The streaming content processing method includes establishing a communication channel with a network selected among a plurality of cellular communication networks and a short range communication network, detecting a playback request signal for playing a streaming content received through the communication channel, configuring a fixed bandwidth corresponding to the selected network as an available bandwidth of the streaming content, transmitting a download request for a data version corresponding to the fixed bandwidth to a server providing the streaming content, downloading the requested data from the server, and playing the streaming content of the downloaded data.

17 Claims, 4 Drawing Sheets

(51) Int. Cl.
*H04N 21/2343* (2011.01)
*H04N 21/442* (2011.01)
*H04N 21/61* (2011.01)
*H04N 21/647* (2011.01)
*H04N 21/6587* (2011.01)

(56) References Cited

U.S. PATENT DOCUMENTS

| | | | |
|---|---|---|---|
| 9,313,245 B2* | 4/2016 | Mandyam | H04L 65/601 |
| 2006/0018378 A1* | 1/2006 | Piccinelli | H04N 19/172 |
| | | | 375/240.03 |
| 2006/0209891 A1* | 9/2006 | Yamada | H04L 45/00 |
| | | | 370/468 |
| 2007/0081507 A1* | 4/2007 | Koo | H04B 7/15542 |
| | | | 370/338 |
| 2007/0105589 A1* | 5/2007 | Lu | H04W 88/02 |
| | | | 455/556.2 |
| 2007/0191012 A1 | 8/2007 | Park et al. | |
| 2008/0040757 A1* | 2/2008 | Romano | H04L 12/4013 |
| | | | 725/81 |
| 2009/0168680 A1* | 7/2009 | Singh | H04L 12/185 |
| | | | 370/312 |
| 2009/0249418 A1* | 10/2009 | Alastruey Gracia | H04N 7/17318 |
| | | | 725/114 |
| 2010/0333148 A1* | 12/2010 | Musha | H04N 21/23406 |
| | | | 725/81 |
| 2011/0093605 A1 | 4/2011 | Choudhury et al. | |
| 2011/0176496 A1* | 7/2011 | Roy | H04N 21/43637 |
| | | | 370/329 |
| 2013/0024582 A1* | 1/2013 | Rodrigues | H04W 76/002 |
| | | | 709/231 |
| 2014/0040498 A1* | 2/2014 | Oyman | H04W 24/04 |
| | | | 709/231 |

* cited by examiner

BANDWIDTH ESTIMATION-BASED STREAMING CONTENT PROCESSING METHOD AND APPARATUS OF TERMINAL

CROSS-REFERENCE TO RELATED APPLICATION(S)

This application claims the benefit under 35 U.S.C. §119(a) of a Korean patent application filed on Feb. 26, 2013 in the Korean Intellectual Property Office and assigned Serial No. 10-2013-0020708, the entire disclosure of which is hereby incorporated by reference.

TECHNICAL FIELD

The present disclosure relates to a streaming content processing method and apparatus. More particularly, the present disclosure relates to a bandwidth estimation-based streaming content processing method and apparatus of a terminal.

BACKGROUND

With advances in wireless communication technology, the interest in wireless devices is growing. Particularly, the mobile multimedia (video and/or audio) streaming service is becoming more popular. The multimedia streaming service makes it is possible to receive audio/video multimedia data in real time other than to download through Internet and/or intranet. That is, the mobile user may play the multimedia stream in real time without downloading the entire file of the multimedia data.

However, the multimedia streaming service of the related art has been provided without consideration of a change in network state especially when the serving network is changed, i.e. when handover occurs, in the wireless communication environment. Recently, the HyperText Transfer Protocol (HTTP) Adaptive Streaming service has been introduced in order to deliver contents efficiently.

The adaptive streaming service is the service in which the communication apparatus receives the data chunk of a playlist appropriate for its current network condition among a plurality of play lists encoded at different bandwidth speeds using HTTP.

In the case of the adaptive streaming service, it is difficult to estimate the network condition of the current communication apparatus for initial content playback. Typically, the communication apparatus starts receiving the data chunk at the lowest bandwidth speed or the highest bandwidth speed of the current network for the initial content playback. This is likely to cause the communication apparatus to receive and play the data at the bandwidth speed lower than its available bandwidth or incur a buffering error or a timeout error in initial adaptive streaming content playback.

Also, the adaptive streaming service of the related art estimates the bandwidth speed based on the history about the corresponding content after initial receipt of data chunk. Accordingly, if the serving network is changed due to movement of the mobile terminal, it is difficult to reflect the condition of the new network and thus difficult to select the best play list. This causes excessive buffering time and incurs a timeout error as in the initial playback and thus leads to a failure of best performance suitable for the changed bandwidth, resulting in user complaints.

Accordingly, a need exists for an improved apparatus and method for preventing streaming content playback delay and error at the initial playback or caused by a change in network condition.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a streaming content processing method and apparatus capable of preventing streaming content playback delay and error at the initial playback and caused by a change in a network condition and providing the user with an optimized streaming service environment.

In accordance with an aspect of the present disclosure, a streaming content processing method of a mobile terminal is provided. The method includes establishing a communication channel with a network selected among a plurality of cellular communication networks and a short range communication network, detecting a playback request signal for playing a streaming content received through the communication channel, configuring a fixed bandwidth corresponding to the selected network as an available bandwidth of the streaming content, transmitting a download request for a data version corresponding to the fixed bandwidth to a server providing the streaming content, downloading the requested data from the server, and playing the streaming content of the downloaded data.

In accordance with another aspect of the present disclosure, a mobile terminal is provided. The mobile terminal includes a radio communication unit configured to establish a communication channel with a server providing a streaming content through a network selected among a plurality of cellular communication networks and a short range communication network, a display unit configured to play the streaming content, and a control unit configured to control detecting a playback request signal for playing a streaming content received through the communication channel, configuring a fixed bandwidth corresponding to the selected network as an available bandwidth of the streaming content, transmitting a download request for a data version corresponding to the fixed bandwidth to a server providing the streaming content, downloading the requested data from the server, and playing the streaming content of the downloaded data.

In an embodiment, the mobile terminal may further include a network manager configured to detect a communication event occurring with at least one of a plurality of cellular communication modules and short range communication modules and to transfer the event to the control unit, a bandwidth extractor configured to determine a type of the connected network and to determine a quality of the bandwidth of the determined network type, a session manager configured to configure the available bandwidth of the streaming content depending on the type of the connected network, a protocol manager configured to control downloading of the streaming data using a protocol predetermined with the server, a play manager configured to play the streaming content of downloaded data and to store the history information of the streaming content, and a storage unit configured to store a mapping table listing fixed bandwidth values mapped to the respective networks.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
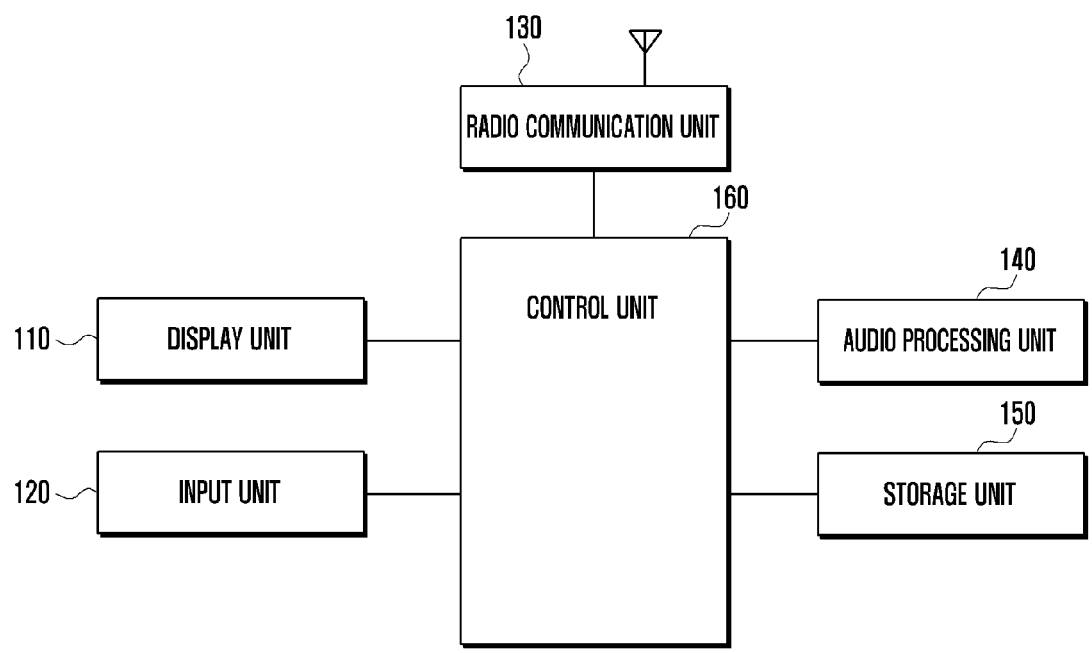
FIG. 1 is a block diagram illustrating a configuration of a mobile terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The streaming data processing method and apparatus of the present disclosure is applicable to a mobile terminal. The mobile terminal includes a mobile phone, a smartphone, a tablet Personal Computer (PC), a hand-held PC, a Portable Multimedia Player (PMP), a Personal Digital Assistant (PDA), etc. In the following, the description is directed to the case where the streaming data processing method and apparatus is applied to a mobile terminal.

It is assumed that the mobile terminal of the present disclosure is capable of establishing a communication channel with a server providing a streaming service and transmitting a request for specific data. The mobile terminal is also capable of performing a procedure of establishing a connection with the server according to a user's control or preconfigured schedule information and receiving specific data provided by the server in response to an input signal. The mobile terminal of the present disclosure is capable of receiving the specific data in the form of a streaming service depending on the capability of the server.

The server providing the streaming service may retain a plurality of list sets encoded at different bandwidth speeds for the video/audio contents. The mobile terminal is capable of receiving the play list appropriate for the network condition of the communication apparatus from the server using Uniform Resource Locator (URL) and HyperText Transfer Protocol (HTTP). The mobile terminal is capable of playing specific content, i.e. video/audio content, in such a way of displaying the streaming data immediately upon receiving from the server. For example, the mobile terminal of the present disclosure is capable of checking the initial playback of the streaming content and the change of the network condition such as a change of the serving network accurately so as to provide the user with the optimized streaming service environment.

According to an embodiment of the present disclosure, the streaming data is played by a specific content player installed in the mobile terminal. The content player for playing the streaming data may interoperate with certain applications supporting the streaming content service or be a player embedded in the Internet browser, but is not limited thereto.

FIG. 1 is a block diagram illustrating a configuration of a mobile terminal according to an embodiment of the present disclosure.

Referring to FIG. 1, the mobile terminal of the present disclosure includes a display unit 110, an input unit 120, a radio communication unit 130, an audio processing unit 140, a storage unit 150, and a control unit 160.

The display unit 110 displays various menus of the mobile terminal and the information input by or presented to the user. The display unit 110 displays various screens, i.e. User Interface (UI), Graphic User Interface (GUI), or User eXperience (UX). The display unit 110 converts the video data from the control unit 160 to an analog signal under the control of the control unit. That is, the display unit 110 is capable of providing various screens associated with the operation of the mobile terminal, e.g. menu screen, application execution screen, keypad screen, message composition screen, webpage screen, etc. The display unit 110 may be implemented in the form of a flat display panel such as a Liquid Crystal Display (LCD), an Organic Light Emitting Diode (OLED), an Active Matrix OLED (AMOLED), etc.

In the case that the display unit 110 is implemented in the form of a touchscreen with a layered touch panel to detect a touch gesture, it can be used as an input means as well as output means. The touch panel is configured to convert the pressure applied to a certain position of the display unit 110 or a change in capacitance at a certain position of the display unit 110 to an electric input signal. The touch panel may be implemented in one of add-on type in which the touch panel is situated on the display unit 110 or on-cell type or in-cell type in which the touch panel is inserted into the display unit 110. The touch panel can be implemented in one of the resistive type, capacitive type, electromagnetic induction type, and pressure type touch panels. The touch panel may be configured to detect the pressure of a touch as well as the touched position and area. For example, if a touch gesture is detected, the touch panel generates an analog signal (e.g. touch input signal), converts the analog signal to a digital signal, and transfers the digital signal to the control unit 160. Here, the touch input signal includes touch coordinates (X, Y). If the touch coordinates are received from the touch panel, the control unit 160 determines that a touch gesture has been made on the touch panel by means of a touch means (e.g. finger, pen, etc.) and, otherwise, if there is not a touch coordinate from the touch panel, determines that the tough has been released. If the touch coordinates are changed, the control unit 160 determines that the touch has moved and thus calculates the displacement of the touch point and the speed of the touch movement. The control unit 160 discriminates among the touch gestures based on the touch coordinates, release of touch, movement of touch, displacement of touch point, and movement speed of touch. The control unit 160 determines the user's touch gesture input and executes a corresponding function.

In an embodiment of the present disclosure, the display unit 110 may display the streaming data received by the radio communication unit 130 under the control of the control unit 160. Here, the streaming data may include at least one of audio and video data.

The input unit 120 receives the input for configuring and controlling functions of the mobile terminal and various text informations and generates corresponding input signal to the control unit 160. The input unit 120 may be implemented with at least one of a touch pad, normal keypad, QWERTY keypad, and function keys designated for specific functions.

The radio communication unit 130 is responsible for a communication function of the mobile terminal. The radio communication unit 130 establishes a communication channel with a cellular communication network to perform voice, video, and data communication. The radio communication unit 130 may include a Radio Frequency (RF) transmitter for up-converting and amplifying the transmission signal and an RF receiver for low noise amplifying and down-converting the reception signal. The radio communication unit 130 may include at least one $2^{nd}$ Generation (2G), 3G, 3.5G, and 4G cellular communication modules, a Wi-Fi communication module, a short range communication module, etc.

For example, the radio communication unit 130 of the present disclosure establishes a data communication channel with the server providing streaming contents, particularly adaptive streaming contents service in response to the user input. The radio communication unit 130 may request the server for a data chunk optimized for the data communication channel to play the streaming content provided by the server under the control of the control unit 160. That is, the radio communication unit 130 receives the data chunk optimized in size to the current network condition in the streaming mode among the data chunks retained in the server and transfers the received data chunk to the control unit 160.

The audio processing unit converts the digital audio signal from the control unit 160 to an analog signal which is output through a speaker and converts the analog signal input through a microphone to the digital signal which is transferred to the control unit 160. The audio processing unit 140 may include a coder/decoder (codec), and the codec may include a data codec for processing packet data and an audio codec for processing audio signal including voice. The audio processing unit 140 converts the digital audio signal to an analog signal by means of the audio codec such that the analog audio signal is output through the speaker. The audio processing unit 140 converts the analog audio signal input through the microphone to the digital audio signal by means of the audio codec and transfers the digital signal to the control unit 160. In an embodiment of the present disclosure, the audio processing unit 140 is capable of outputting the audio signal included in the streaming data received from the server when playing the streaming data.

The storage unit 150 stores an Operating System (OS) of the mobile terminal, various applications, and data related to the execution of the applications and generated by the mobile terminal and received from outside of the mobile terminal (e.g. from an external server, other mobile terminals, a personal computer, etc.). The storage unit 150 may store the user interfaces provided by the mobile terminal and various settings for processing mobile terminal functions.

In an embodiment of the present disclosure, the storage unit 150 may store a mapping table listing the fixed bandwidth values mapped to the types of networks connected for communicating data of streaming contents as shown in Table 1. Table 1 is an exemplary network-bandwidth mapping table, but the present disclosure is not limited thereto.

TABLE 1

| Network | Fixed bandwidth value |
| --- | --- |
| 2 G network | 100 kbps |
| 3 G network | 500 kbps |
| 4 G or Wi-Fi network | 1 Mbps |

In the case that there is no history on the streaming content to be played (e.g. initial playback of content), the control unit 160 sets a fixed bandwidth value mapped to the type of the currently connected network based on the mapping table. The control unit 160 controls the radio communication unit 130 to receive the streaming data at an available data rate corresponding to the fixed bandwidth value set with the server. If the serving network is changed in the state of playing the content, the control unit 160 resets the bandwidth value mapped to the type of the new network and receives the streaming data at the available data rate corresponding to the reset bandwidth value. The network types and fixed bandwidth values of the mapping table may be changed depending on the change of the networks.

The control unit 160 controls the overall operations of the mobile terminal and signal flows among the internal components of the mobile terminal and processes data. For example, the control unit 160 controls power supply from a battery to the internal components. If the mobile terminal powers on, the control unit 160 controls a boot-up process of the mobile terminal and executes applications loaded from the program region for the functions of the mobile terminal according to the user settings.

A description is made of certain functions of the control unit hereinafter with reference to FIG. 2.

Figure 2:
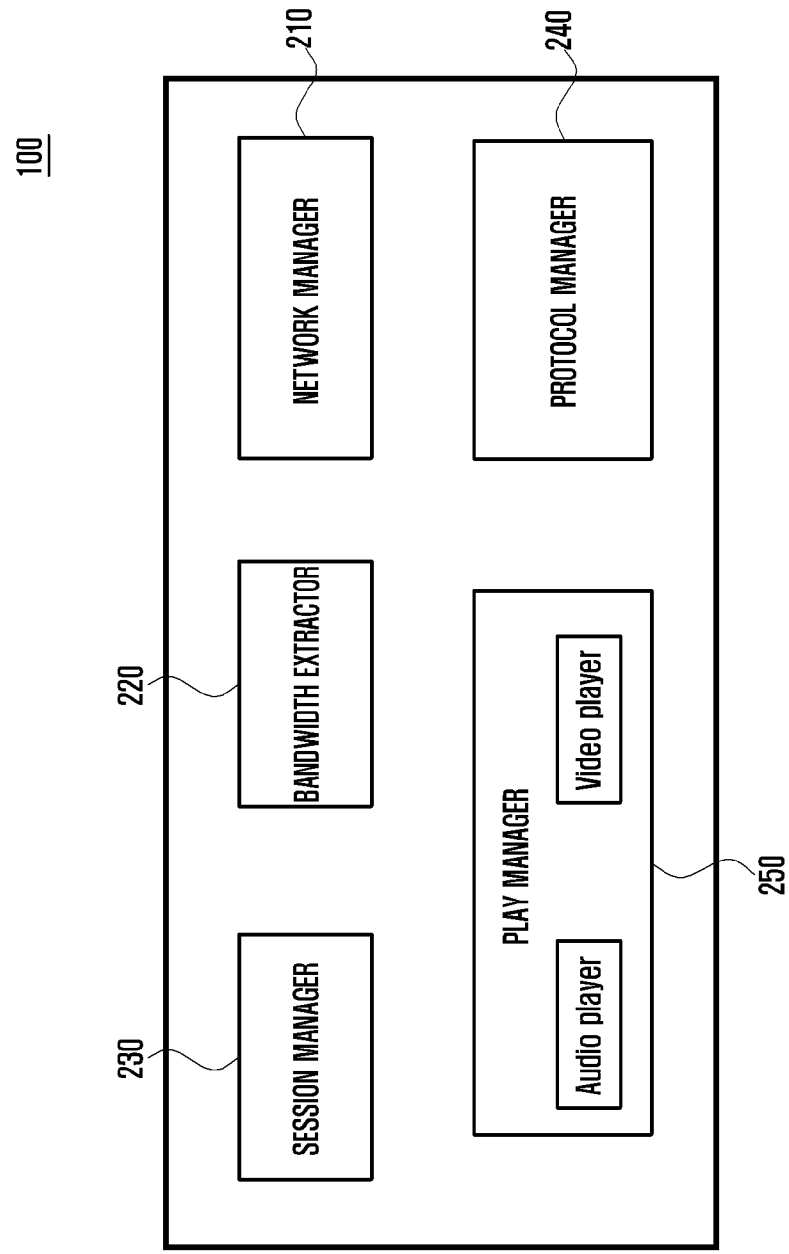
FIG. 2 is a block diagram illustrating a configuration of a platform of a mobile terminal according to an embodiment of the present disclosure.

FIG. 2 is a block diagram illustrating a configuration of a platform of a mobile terminal according to an embodiment of the present disclosure.

The streaming content processing apparatus according to an embodiment of the present disclosure is capable of operating on various mobile platforms. The mobile platform is installed on the mobile terminal to make it possible for the higher layer to use the hardware function and provide a programing environment and application execution environment on the application layer as the highest layer and associated with entire software from the OS to the application framework. The mobile platform may include Binary Runtime Environment for Wireless (BREW), General Virtual Machine (GVM), Wireless Internet Platform for Interoperability (WIPI), Java 2 Platform Micro Edition (J2ME), iOS, Android, BaDa, mobile window, etc. Hereinafter, a description is made of the configuration of the mobile terminal based on the mobile platform in more detail. The platform configured as shown in FIG. 2 may be embodied in the control unit or the storage unit of FIG. 2 but the present disclosure is not limited thereto.

Referring to FIG. 2, the mobile terminal 100 may include a network manager 210, a bandwidth extractor 220, a session manager 230, a protocol manager (HTTP controller) 240, and a play manager 250.

The network manager 210 detects a communication event occurring by at least one of the 2G communication module, the 3G communication module, the 3.5G communication module, the 4G communication module, the Wi-Fi communication module, and the short range communication module. The network manager 210 sends the information on the communication module, which has established a communication channel with a base station (or access point, another terminal, or server), to the bandwidth extractor 220.

The bandwidth detector 220 determines the type of the network, i.e. type of the established communication channel (e.g. Wi-Fi channel, 3G communication channel, and 4G communication channel), based on the communication module information provided by the network manager. The bandwidth extractor 220 determines the radio environment, i.e. the bandwidth quality of the network of the communication link, based on the busy rate indicating the available shared radio link usage time and packet error rate. In more detail, the bandwidth extractor 220 determines whether there is any data associated with other functions using the network used for establishing the communication channel and determines the quality level of the network based on the data of the other functions. The quality level of the network is described later with reference to Table 2. The bandwidth extractor 220 sends the information on the network type and quality level to the session manager 230.

If there is history information on the streaming content to be downloaded, the bandwidth extractor 220 extracts the bandwidth information of the previously downloaded data chunk from the history information and sends the bandwidth information to the session manager 230.

The session manager 230 configures the bandwidth value of the corresponding network based on the network type and quality level information provided by the bandwidth extractor 220. The session manager 230 sends the protocol manager 240 a request for specific data chunk having the configured bandwidth value as the threshold among the play list of the server based on the configured bandwidth value.

The protocol manager 240 downloads the data chunk using the communication protocol based on the specific data chunk request information received from the session manager 230. For example, the protocol manager 240 may include an HTTP stack. The protocol manager 240 may determine the address of the streaming data chunk by exchanging connection and request/response procedure with the server using the HTTP protocol and receive the streaming data from the corresponding address link.

The play manager 250 may include a content player, e.g. audio player and video player, for playing the streaming content. The play manager 250 decodes the streaming data received through the communication channel and controls such that the video is processed by the display unit 110 and the audio by the audio processing unit 140 for streaming data playback.

The play manager 250 controls such that the streaming data received from the server, i.e. data chunks, are stored temporarily or semi-persistently. At this time, the streaming data may be buffered in a buffer. Here, the buffer may be used to support various functions of the mobile terminal.

The play manager controls such that history information including the playback information of the received streaming content, data rate, bandwidth, and radio signal reception strength is stored in the storage unit 140.

Although it is difficult to enumerate all of the functional components that can be converged in various manners according to the trend of digital convergence, the mobile terminal 100 may further include a sensor module for collecting the information on the location change of the terminal, a Global Positioning System (GPS) module for measuring the location of the terminal, a camera module, etc. that are not enumerated above. According to an embodiment of the present disclosure, each of the components constituting the mobile terminal may be omitted or substituted by an equivalent component. According to an embodiment of the present disclosure, the input unit may be implemented with at least one of the touchscreen 110, the key input unit 120, a touchpad, and a trackball.

Figure 3:
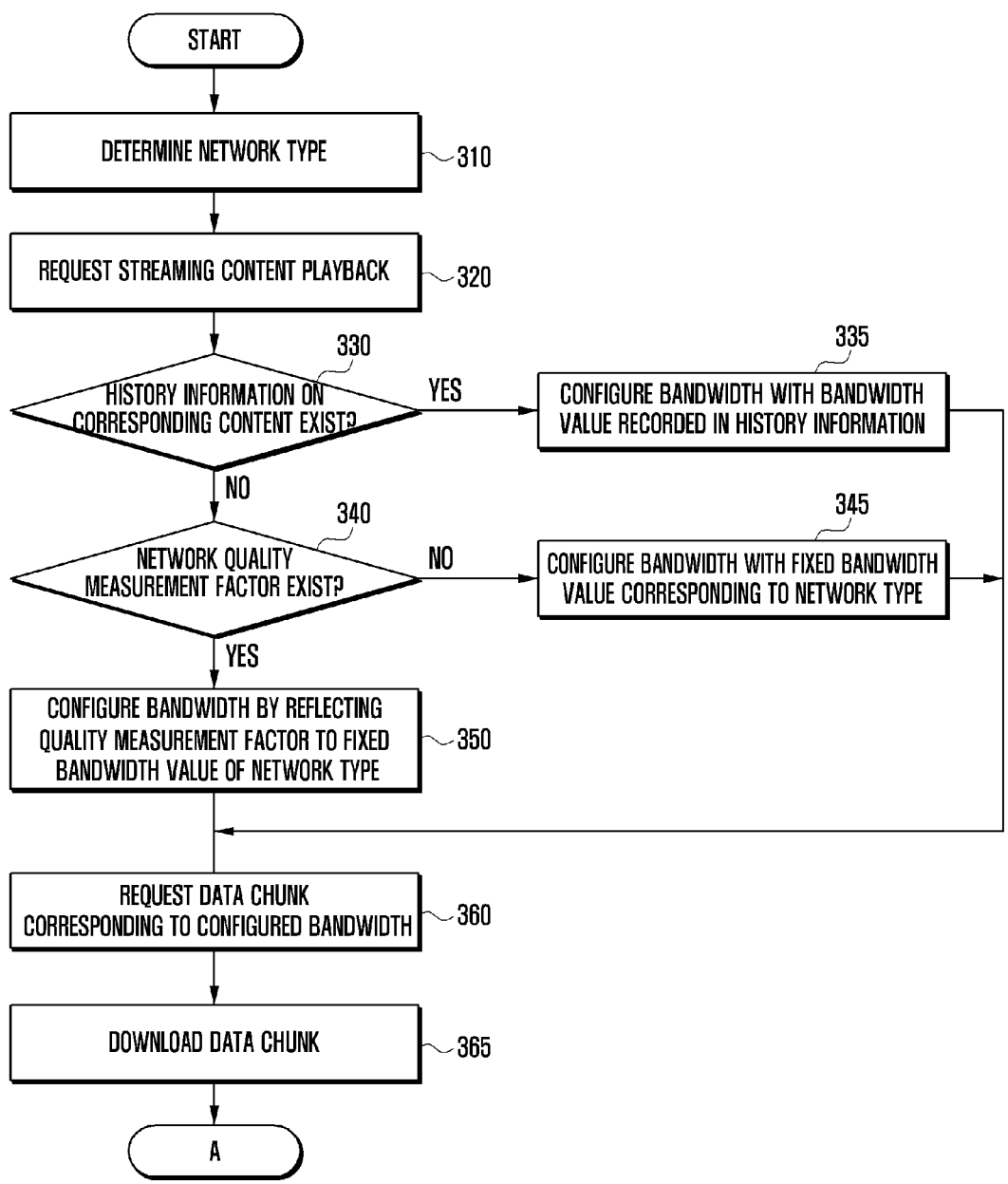
FIGS. 3 and 4 are a flowchart illustrating a data segment reception procedure of a mobile terminal in a streaming content processing method according to an embodiment of the present disclosure.
Figure 4:
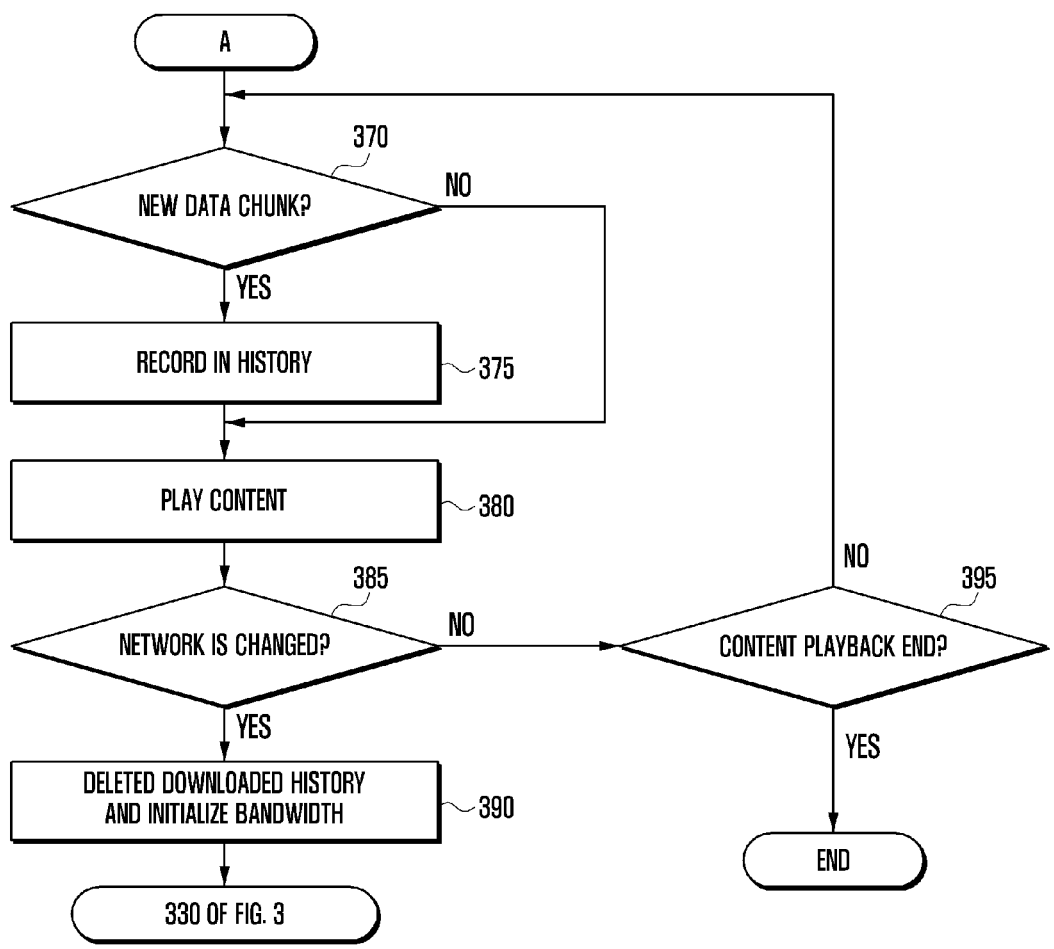

FIGS. 3 and 4 are a flowchart illustrating a data segment reception procedure of the mobile terminal in the streaming content processing method according to an embodiment of the present disclosure.

Referring to FIGS. 3 and 4, in order for the mobile terminal to download and play content in a streaming manner, the control unit 160 determines the type of the network of the communication channel established by the radio communication unit 130 at operation 310. The control unit 160 may determine the type of the network (e.g. one of Wi-Fi channel, 3G channel, 4G channel, and 2G channel) based on the communication module activated in the radio communication unit 130.

According to an embodiment of the present disclosure, the mobile terminal 100 may determine the type of network according to a user request (e.g. switching from 4G network to 3G network by the user) or a predetermined network management procedure (e.g. switching to the Wi-Fi network when the mobile terminal enter the Wi-Fi area).

The control unit 160 detects the streaming content playback request signal at operation 320. Although the description is directed to the case where the streaming service is the video content streaming service, the present disclosure is not limited thereto but applicable to the audio content service and other media content services. Here, the service request signal may be a signal of triggering the start of the streaming content playback.

In the case that the streaming content is played by a content player interoperating with a certain application, detecting an application execution request signal and a specific content selection signal may be followed by the content playback request signal detection. In the case that the streaming content is played by a content player of the web browser, detecting a web browser execution request signal is followed by the content playback request signal detection.

If the streaming content playback request signal is detected, the control unit 160 determines whether there is any history information on the corresponding content at operation 330. Here, the history information may include the playback history of the streaming content to be downloaded, data downlink speed, communication link bandwidth, data amount, date, data length, etc.

If there is any history information on the corresponding content, the control unit 160 configures the bandwidth value of the communication channel based on the information contained in the history information at operation 335.

If there is no history information on the corresponding content, the control unit 160 determines whether there is a quality measurement factor of the network corresponding to the communication channel at operation 340. Here, the quality measurement factor denotes the network quality information determined based on the data of other functions (or applications) which have been transmitted/received through the network corresponding to the established communication channel.

It may be assumed that the mobile terminal has established a 3G communication channel with a base station by means of the radio communication unit 130 and the optimized bitrate of the 3G network is 500 kbps. The user may use other functions such as Internet access and motion/still picture upload/download in addition to the streaming content service. However, the network condition may be degraded in bandwidth or data rate due to various reasons such as an increased number of users or a change of radio environment. Also, it may fail to receive data normally on the previously established data channel in a specific state.

According to an embodiment of the present disclosure, if there is data of other functions using the corresponding network, the mobile terminal determines the network quality measurement information. The control unit 160 determines the network quality measurement factor and classifies the network quality as shown in Table 2. Table 2 is an exemplary network-quality level mapping table, but the present disclosure is not limited thereto.

TABLE 2

| Network type | Quality level |
| --- | --- |
| 2 G network | EX(Excellent) |
|  | VG(Very Good) |
| 3 G network | GD(Good) |
|  | P(Poor) |
| 4 G network or Wi-Fi network | VP(Very Poor) |

In Table 2, the EX level corresponds to using 100% of the bandwidth constant value of the corresponding network type, the VG level corresponds to using 90~80% of bandwidth constant value, the GD level corresponds to using 80~70% of bandwidth constant value, the P level corresponds to using 70~60% of bandwidth constant value, and the VP level corresponds to using below 60% of bandwidth constant value, but without limitation thereto.

For example, if the corresponding network shows the optimized bit rate (i.e. 100%) based on the data information of motion picture download and upload, the control unit 160 classifies the network quality level into EX and, if the corresponding network shows the bit rate of 80~90%, the control unit 160 classifies the network quality level into VG. Here, the ranges of the quality levels may be configured at the mobile terminal manufacturing stage.

In an embodiment of the present disclosure, if there is any measurement factor capable of measuring of the current network quality in addition to the information on other functions (or applications) data on the network, the control unit 160 may configure the bandwidth value by reflecting the corresponding measurement factor.

If there is the network quality measurement factor, the control unit 160 configures the streaming content bandwidth value by reflecting the quality measurement factor to the fixed bandwidth value of the corresponding network at operation 350.

For example, if it is determined that the corresponding network has the optimized bit rate (i.e. 100%) based on the data information of motion picture download and upload, the control unit 160 classifies the network quality into EX and, otherwise if the network has the bit rate of 80~90%, classifies the network quality into VG. Here, the ranges of the quality levels may be configured at the mobile terminal manufacturing stage.

If the mobile terminal is connected to the 3G network which has an optimized bit rate of 500 kbps, the user may perform a voice communication, a video communication, an Internet access, and a motion/still picture transmission. At this time, the control unit 160 may classify the current quality of the 3G network into VG level based on the 3G network usage record and data with the other function (or application). In this case, the control unit 160 reflects the VG level to the fixed bandwidth value so as to configure the bandwidth value to 90 kbps or 80 kbps which is relatively lower than the EX level.

If there is no network quality measurement factor, the control unit 160 configures the bandwidth value of the streaming content with a fixed bandwidth value based on the network-bandwidth mapping table at operation 345.

For example, the control unit 160 may connect the terminal to the 3G network by referencing Table 1 and, if there is no network quality measurement factor, sets the bandwidth value of the communication channel for downloading the streaming value to 500 kbps. The control unit 160 also may connect the terminal to the 4G network or a Wi-Fi network and, if there is no network quality measurement factor, sets the bandwidth value of the communication channel for downloading the streaming value to 1 Mbps.

The control unit 160 controls the radio communication unit 130 to transmit a signal to request a data chunk corresponding to the configured bandwidth value at operation 360 and receives, i.e. downloads, the data chunk of the streaming content from the server by means of the radio communication unit 130 at operation 365.

Here, the server may be the server providing the service in the adaptive streaming manner. The server providing the adaptive streaming content server transmits the data segment, i.e. data chunk, to the terminal using HTTP to support the content playback service. The adaptive streaming service provides the data of the content in units of chunk. The server has a list of data chunk sets of several versions classified by content resolution and provides the mobile terminal with the corresponding data chunk in response to the terminal's request. That is, the mobile terminal sends the server the bandwidth value information optimized depending on the network type of the established communication channel, and the server sends the mobile terminal the data chunk corresponding to the bandwidth value information. The mobile terminal is capable of downloading and playing the streaming content without a buffering error even in the initial playback of the streaming content.

The control unit 160 determines whether the data chunk is a new data chunk having no history record at operation 370. That is, the control unit 160 may determine the initial data chunk to be played initially or the data chunk downloaded after changing the network as the new data chunk.

If it is determined that the data chunk is a new data chunk, the control unit 160 records the download speed and bandwidth of the data chunk as the history information of the corresponding streaming content at operation 375. The control unit 160 configures the bandwidth value of the subsequent data chunk based on the bandwidth value recorded in the history to download the data chunk of the play list corresponding to the configured bandwidth value.

The control unit 160 plays the streaming content using the downloaded data chunk at operation 380. The control unit 160 decodes the data chunk downloaded by means of the radio communication unit 130 and controls the display unit 110 to display the video data and the audio processing unit 130 to output audio data.

The control unit 160 determines whether the serving network is changed in the state of playing the streaming content at operation 385. The control unit 160 may determine whether the serving network is changed based on the information of the communication module activated in the radio communication unit 130. For example, when the mobile terminal user connected to the 3G network moves to a Wi-Fi area, the communication channel established by the radio communication unit may be switched from the 3G network to the Wi-Fi network.

If it is determined that the serving network is changed based on the activated module information of the radio communication unit 130, the control unit 160 deletes the history information of the content being downloaded and initializes the configured bandwidth value at operation 390. Since there is no history information on the corresponding content, the control unit 160 returns the procedure to operation 330 of FIG. 3. That is, the control unit 160 reconfigures the bandwidth value in correspondence to the changed network to download the data chunk at the optimized bandwidth speed.

If it is determined that the serving network is not changed, the control unit 160 determines whether the content playback end signal is detected at operation 395. If the content playback end signal is detected, the control unit 160 stops downloading the data chunk and, otherwise, the procedure goes to operation 370 to continue receiving the data chunk and playing the content.

As described above, the streaming content processing method of the present disclosure is capable of downloading the streaming data at the bandwidth speed optimized for the network type of the communication channel at initial playback of the streaming content and after a change of the network. Afterward, the subsequent streaming data is downloaded and played at the bandwidth speed predicted based on the initial streaming data history information. In this manner, the streaming content processing method and apparatus of the present disclosure is capable of providing optimized content streaming environment and reducing error occurrence rate at change of serving network as well as at initial playback.

Also, the streaming content processing method and apparatus of the present disclosure is capable of estimating and configuring the bandwidth speed available for the network to which the communication channel is established even though the terminal starts initial playback of the streaming content or the serving network is changed in the state of playing the streaming content, thereby receiving the data optimized adaptive to the network condition.

Although the streaming data processing method and apparatus according to preferred embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A streaming content processing method of a mobile terminal, the method comprising:
    establishing a communication channel with a network selected among a plurality of cellular communication networks and a short range communication network;
    detecting a playback request signal for playing a streaming content received through the communication channel from a server;
    identifying a quality of the communication channel based on a fixed bandwidth of the communication channel;
    calculating an available bandwidth of the communication channel based on the identified quality of the communication channel;
    determining, by the mobile terminal, a data version of the streaming content to be requested, based on the available bandwidth;
    transmitting a download request including the determined data version of the streaming content, to the server providing the streaming content;
    downloading the requested streaming content corresponding to the data version from the server; and
    playing the downloaded streaming content,
    wherein the data version comprises one of a plurality of data versions of the streaming content, and
    wherein each of the plurality of data versions corresponds to at least one different available bandwidth.

2. The method of claim 1, wherein the calculating of the available bandwidth comprises calculating the fixed bandwidth of the communication channel as the available bandwidth when no history information related to the streaming content exists at the mobile terminal.

3. The method of claim 2, wherein the calculating of the available bandwidth is based on a mapping table listing fixed bandwidth values mapped to the respective networks.

4. The method of claim 2, wherein the calculating of the available bandwidth further comprises calculating, when history information related to the streaming content exists, a bandwidth value recoded in the history information as the available bandwidth of the streaming content.

5. The method of claim 4, further comprising:
   determining whether the connected network is changed while the streaming content is being played; and
   initializing, when the connected network is changed, the bandwidth value with deletion of the history information on the streaming content.

6. The method of claim 1, further comprising storing, when the downloaded streaming content corresponding to the data is new data having no history, data rate and data information of the downloaded streaming content corresponding to the data as history information.

7. The method of claim 2, wherein the identifying of the quality comprises:
   determining whether a connected network quality measurement factor exists;
   determining, when the connected network quality measurement factor exists, a quality level of the connected network based on the quality measurement factor; and
   calculating the available bandwidth corresponding to the streaming content by reflecting the quality level to the fixed bandwidth value of the connected network.

8. The method of claim 1, wherein the downloading of the requested streaming content corresponding to the data version comprises:
   receiving an address of the data version to be downloaded; and
   downloading the data version from the address.

9. The method of claim 1, wherein the downloading of the requested streaming content corresponding to the data version comprises downloading data chunks of a list corresponding to the available bandwidth among play lists of the streaming content provided by the server.

10. A mobile terminal comprising:
   a radio communication unit configured to establish a communication channel with a server providing a streaming content through a network selected among a plurality of cellular communication networks and a short range communication network;
   a display unit configured to play the streaming content; and
   at least one processor configured to control to:
      detect a playback request signal for playing a streaming content received through the communication channel from a server,
      identify a quality of the communication channel based on a fixed bandwidth of the communication channel,
      calculate an available bandwidth of the communication channel based on the identified quality of the communication channel,
      determine, by the mobile terminal, a data version of the streaming content to be requested, based on the available bandwidth,
      transmit a download request including the determined data version of the streaming content, to the server providing the streaming content,
      download the requested streaming content corresponding to the data version from the server, and
      play the downloaded streaming content,
   wherein the data version comprises one of a plurality of data versions of the streaming content, and
   wherein each of the plurality of data versions corresponds to at least one different available bandwidth.

11. The mobile terminal of claim 10, wherein the at least one processor is further configured to calculate, when no history information related to the streaming content exists at the mobile terminal, the fixed bandwidth of the communication channel as the available bandwidth.

12. The mobile terminal of claim 10 further comprising:
   a network manager configured to detect a communication event occurring with at least one of a plurality of cellular communication modules and short range communication modules and to transfer the event to the at least one processor;
   a bandwidth extractor configured to determine a type of the connected network and to determine a quality of bandwidth of the determined network type;
   a session manager configured to calculate the available bandwidth corresponding to the streaming content depending on the type of the connected network;
   a protocol manager configured to control downloading of the data version using a protocol predetermined with the server;
   a play manager configured to play the streaming content of the downloaded data version and to store history information of the streaming content; and
   a storage unit configured to store a mapping table listing fixed bandwidth values mapped to the respective networks.

13. The mobile terminal of claim 10, wherein the at least one process is further configured to calculate, when history information related to the streaming content exists, a bandwidth value recoded in the history information as the available bandwidth corresponding to the streaming content.

14. The mobile terminal of claim 10, wherein the at least one processor is further configured to:
   determine whether a connected network quality measurement factor exists,
   determine, when the connected network quality measurement factor exists, a quality level of the connected network based on the quality measurement factor, and
   calculate the available bandwidth corresponding to the streaming content by reflecting the quality level to a fixed bandwidth value of the connected network.

15. The mobile terminal of claim 10, wherein the at least one processor is further configured to:
   store, when the downloaded streaming content corresponding to the data version is new data having no history, data rate and data information of the downloaded data version as history information, and
   initialize, when the connected network is changed, a bandwidth value with deletion of the history information on the streaming content.

16. The mobile terminal of claim 10, wherein the at least one processor is further configured to control downloading data chunks of a list corresponding to a calculated bandwidth value among play lists of the streaming content provided by the server.

17. A non-transitory computer-readable storage medium storing instructions that, when executed, cause at least one processor to perform the method of claim 1.

* * * * *